Patented May 10, 1932

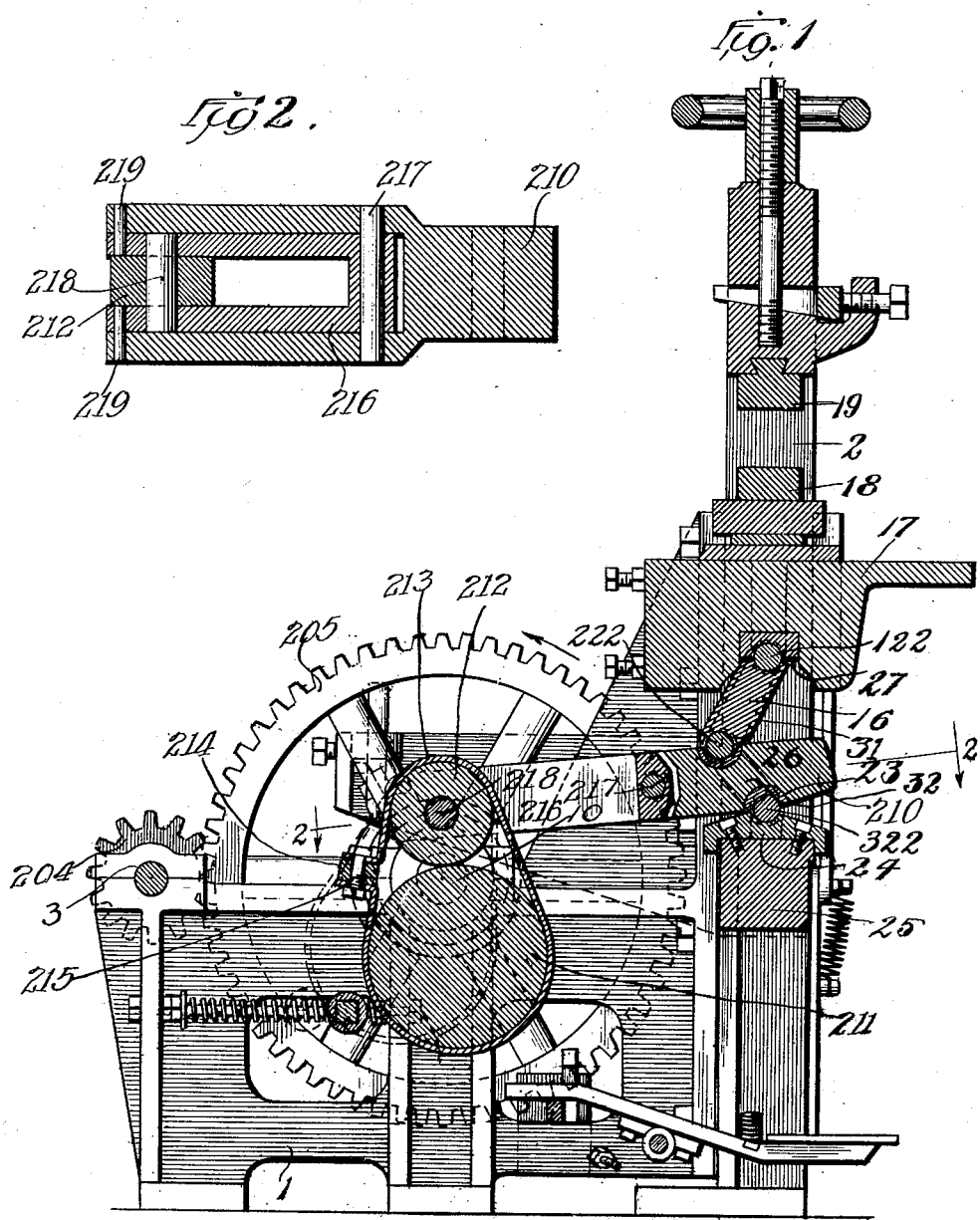

1,857,286

UNITED STATES PATENT OFFICE

JOSEPH O. POLLACK, OF CHICAGO, ILLINOIS

PRESS

Application filed July 13, 1929. Serial No. 377,945.

My invention relates to the general class of presses and particularly to the class of presses adapted for use in manufacturing jewelry and other articles. The present invention is in the nature of an improvement over the devices shown in applicant's own Patents Serial No. 1,608,954, November 30, 1926, and Serial No. 1,608,955, November 30, 1926.

An object of the invention is the production of improved means for releasing the toggle arms in the event that the device should become jammed in operation.

A further object of the invention is the production of a device of this character that is compact, simple, convenient, durable, efficient, and satisfactory for use wherever found applicable.

Many other objects and advantages of the construction herein shown and described will be obvious to those skilled in the art from the disclosure herein given.

The device includes novel means for retrieving the movable head after the article has been stamped. A toggle arrangement is employed for moving the head into operative position and a link structure is provided about the arms of the toggle whereby the movable head is retrieved upon the breaking of the strut formed by the toggle in forcing the movable head into operative position. The links provide a direct connection between the cam and the head and pull directly downward on the head.

To this end the invention consists in the novel construction, arrangement and combination of parts herein shown and described, and more particularly pointed out in the claims.

In the drawings, wherein like reference characters indicate like or corresponding parts:

Fig. 1 is a vertical sectional view of the device; and

Fig. 2 is a section on the line 2—2 of Fig. 1.

Referring to the drawings, at 1 is shown a suitable frame having an upright portion 2 at one end thereof. Journaled on the frame 1 is a shaft 3 having a gear 204 at one end thereof. A second shaft 10 is journaled on the frame 1, said shaft having a relatively large gear 205 positioned at one end thereof and outside of frame 11. Gear 205 meshes with the gear 204. The shaft 10 has a cam 211 thereon which is engaged by a roller 212 mounted in the bifurcated end of a toggle arm 210. The cam 211 and the roller 212 are preferably held in contacting relation by a metal strap or similar device 213.

Toggle arm 210 cooperates with a toggle arm 16 in controlling the movement of a head 17, slidable in the upright portion 2, and upon which is mounted a movable die 18. Opposite the movable die 18 is a stationary die 19 which is mounted upon the adjustable stationary head 20. The toggle arm 210 has one bearing point at 21 which is preferably formed by positioning a cylindrical member 322 between a semi-cylindrical depression preferably formed in a hardened block 23 set in arm 210 and a second semi-cylindrical depression formed in a bearing block 24 secured to a cross member 25 on the upright frame portion 2. A toggle joint 26 has a similar structure as well as the joint formed at 27 between the arm 16 and the movable head 17. Each of the cylindrical members have reduced ends. The bearing block 24 secures its adjacent cylindrical member 322 to itself by means of plates 29 which fit over the ends of the cylindrical member 322. The head 17 is secured to its adjacent cylindrical member 122 by plates 30 positioned preferably in recesses in said head. Links 31 connect the cylindrical member 122 adjacent head 17 and the cylindrical member 222 at the toggle joint. Links 32 connect the cylindrical members 322 adjacent bearing block 24 and the cylindrical member 222 at the toggle joint. It is thus readily seen that upon a releasing movement of the arm 210 the head 17 is retrieved by a direct pull to the position shown in full lines in Fig. 7.

The shaft 10 provides a mounting for an eccentric cam 211 which actuates the toggle arm 210 in the same manner as already described for the other modifications of the invention. A roller 212 is suitably mounted on the toggle arm 210 and is held in operative engagement with the cam 211 by a band 213. The band 213 is adjustable to compensate for wear stretching or the like by providing a block 214 between the out turned ends of the band. A bolt 215 clamps the ends of the band 213 and the block 214 together. By varying the thickness of the block 214 the effective length of the band 213 can be changed as desired.

Provision is made for relieving the toggle arm 210 in the event that the arm becomes bound or for any reason is subjected to excessive stresses during the actuation of the press. For this purpose I have provided in the bifurcated end of the arm 210 a U-shaped member 216. The member 216 is mounted on a pin 217 about which the member is adapted to rotate. The roller 212 is rotatably mounted on a pin 218 preferably positioned near the outer ends of the arm 210 and of the member 216. A pair of pins 219 connects the open end of the member 216 with the contiguous bifurcations of the arm 210 and prevents the member from rotating about the pin 217 as a pivot. The pins 219 are constructed of frangible material and are of sufficient cross section to resist the shearing movement resulting from contact of the roller 212 with the cam 211 under ordinary pressures incidental to the operation of the press. Should the movable head, for any reason become wedged in the ways or the toggle arm 210 be subjected to undue stress for any other reason, the pins 219 will shear off along the planes between the member 216 and the bifurations of the toggle arm 210. The pins 219 are relatively inexpensive and are easily replaced. This construction avoids all possibility of the roller 212 and the cam 211 becoming wedged. The possibility of the various parts being strained to the breaking point as a result of the actuating members becoming wedged or jammed is also eliminated.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a device of the class described, a toggle arm having a bifurcated end, a member positioned between the bifurcations of said arm, a pin connecting the bifurcations to provide a pivotal mounting for said member, a roller pivotally mounted on said member, and second pin forming a frangible connection between said member and said arm, said frangible pin being adapted to prevent rotation of said member about said first mentioned pin as a pivot under normal conditions of stress in said toggle arm and to permit such rotation by shearing off when said arm is subjected to excessive stresses.

2. In a device of the class described, a toggle arm having a bifurcated end, a member positioned between the bifurcations of said arm, a pin connecting the bifurcations to provide a pivotal mounting for said member, a roller pivotally mounted on said member, a cam adapted to operatively engage said roller to actuate the arm and a second pin forming a frangible connection between said member and said arm, said second mentioned pin being adapted to hold said member in fixed relation to the arm for normal pressures between said roller and cam, and to shear for an excessive pressure between said roller and cam.

3. In a device of the class described, a toggle arm having a bifurcated end, a member positioned between the bifurcations of said arm, a pin connecting the bifurcations to provide a pivotal mounting for said member, a roller pivotally mounted on said member, a cam adapted to operatively engage said roller to actuate the arm, a second pin forming a frangible connection between said member and said arm, said second mentioned pin being adapted to hold said member in fixed relation to the arm for normal pressures between said roller and cam and to shear for excessive pressures between said roller and cam and an adjustable band operable to maintain said roller and cam in operative engagement.

4. In a toggle press, a frame, a movable head, a pair of toggle arms hinged together, a pivotal connection between one of said arms and the movable head, a pivotal connection between the other of said arms and said frame, the free end of said last mentioned arm being bifurcated, a member positioned between the bifurcations of said arm, a pin connecting the bifurcations to provide a pivotal mounting for said member, a second pin forming a frangible connection between said member and said bifurcated arm, and cam means operable by contact with said member to cause oscillation of the arm when said frangible connection is intact.

5. In a toggle press, a frame, a movable head, a pair of toggle arms hinged together, a pivotal connection between one of said arms and the movable head, a pivotal connection between the other of said arms and said frame, the free end of said last mentioned arm being bifurcated, a member positioned between the bifurcations of said arm, a pin connecting the bifurcations to provide a pivotal mounting for said member, a second pin forming a frangible connection between said member and said bifurcated arm, and cam means operable by contact with said member to cause oscillation of the arm when said second pin is intact, the contact of said cam means with said member being inoperable to oscillate said arm when said second pin is broken.

In testimony whereof, I have hereunto signed my name.

JOSEPH O. POLLACK.